United States Patent

[11] 3,549,143

[72] Inventor D Howard Gilliam,
 20975 Valley Green Drive, Cupertino,
 Calif. 95014
[21] Appl. No. 783,456
[22] Filed Dec. 5, 1968
[45] Patented Dec. 22, 1970

[54] ELASTIC TENSION CORD
 3 Claims, 5 Drawing Figs.
[52] U.S. Cl. .................................................. 267/74,
 267/1
[51] Int. Cl. .................................................. F16f 13/00
[50] Field of Search ......................................... 267/74, 69,
 152, 73, 71, 153

[56] References Cited
UNITED STATES PATENTS
2,805,058 9/1957 Grant ........................... 267/69
FOREIGN PATENTS
236,649 9/1960 Australia ..................... 267/1(.52)
320,050 4/1953 Switzerland ................. 267/74

Primary Examiner—James B. Marbert
Attorneys—Eckhoff and Hoppe and Robert Charles Hill ABSTRACT: An elastic tension cord is provided with an elongated body and apertures near the ends hereof. Each aperture is surrounded by a ring member which is embedded in the elongated body.

PATENTED DEC 22 1970

3,549,143

INVENTOR.
D HOWARD GILLIAM
BY
Eckhoff and Hoppe
ATTORNEYS

ELASTIC TENSION CORD

BACKGROUND OF THE INVENTION

1. Field of the Invention

An elastic tension cord having an elongated body and apertures near the ends thereof is provided with an embedded ring member which surrounds each aperture.

2. Description of the Prior Art

A search was made on this structure prior to the filing of the application. The search did not reveal any patents which disclosed an elastic tension cord having embedded ring members surrounding the apertures which apertures are located near the ends of the cord.

SUMMARY OF THE INVENTION

Elastic tension cords in the form of elongated straps of rubber, neoprene and the like have been developed for various uses, especially where considerable elongation and recovery are required intermittently, and where size, weight, durability and cost are factors. A typical example of such use is as a safety and controlling member for derricks equipped with extendable stingers or booms, wherein the controlling member is connected to a fixed bracket at one end and is attached at the other end to winch line which in turn passes over a sheave located at the end of the boom.

In order to relieve the boom operator of the manual effort involved in keeping track of the winch line as the boom is extended especially when the boom is used with another tool, as for example an auger bit has been customary to use various types of securing means to keep the winch line in place. Many different straps have been used for this purpose, but difficulty has been encountered in providing suitable straps of adequate strength and durability for connecting the winch line to fixed bracket as the boom is extended an appreciable distance.

This and a other applications of such an elastic tension cord present a difficult problem of adequate strength and tear-resistance at the end portions of the cord. Heretofore the most suitable way of providing an elastic tension cord with connecting means was to avoid any apertures in the cord itself and to mold metallic inserts into the respective ends of the cord with each insert having an exposed eye or clevis for attachment purposes, a typical example being shown in U.S. Pat. No. 2,805,058. However, no matter how fancy or technical the design of the insert, these cords proved ineffective for high tension uses as the cords repeatedly ruptured and tore at their weakest point, namely at the ends thereof in the region of the interface between the metallic insert and the elastomer.

All of the prior art devices are unfit for selected applications because they do not incorporate into their design a structure sufficient to counteract a basic physical principle which is that tensile force in the form of elongating an elastic body is the hardest physical punishment that can be inflicted upon the elastic body.

The present invention overcomes the above described disadvantages by employing embedded rings around the cord apertures so that the portion of the cord most likely to rupture under tensile force is actually under compression during the exertion of the tensile force.

It is the primary object of the present invention to provide a new and improved elastic tension cord.

Another object is to provide an elastic tension cord construction which under tension results in the portion of the cord most likely to rupture being under compression.

A further object of the invention is to provide structure which is long lasting in usage while being relatively simple in design and inexpensive to manufacture.

DESCRIPTION OF A PREFERRED EMBODIMENT

Figure 3:
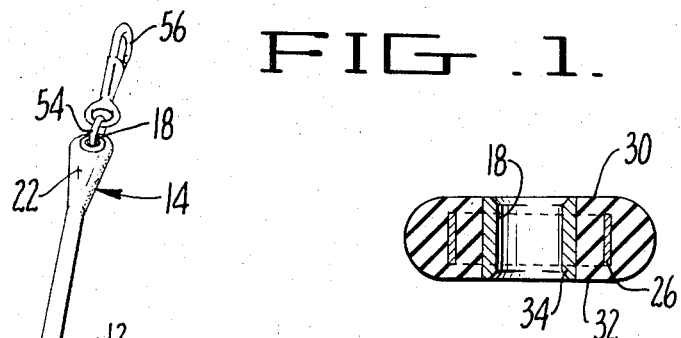
FIG. 3 is a sectional view illustrating the relationship of the embedded ring to the cord body.
Figures 2, 4, 5:
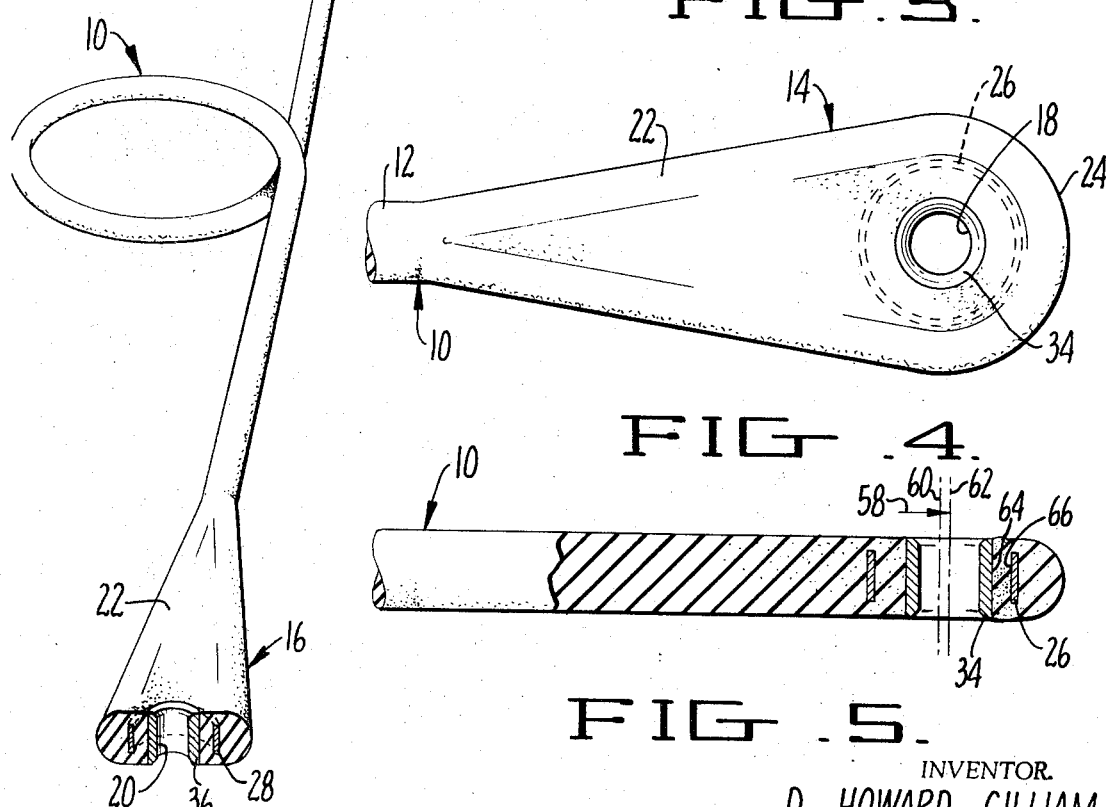
FIG. 2 is a fragmentary perspective view illustrating the cord structure of the present invention.
FIG. 4 is a partial plan view illustrating an end of the elastic tension cord with the embedded ring in dotted outline.
FIG. 5 is a sectional view illustrating a portion of the cord in compression during the application of a tensile force.

Referring particularly to FIGS. 2 through 4 there is shown an elastic tension cord, generally indicated 10, constructed in accordance with the present invention and having a body 12 of uniform cross-sectional area terminating in enlarged end portions generally indicated 14 and 16. The cord is preferably formed of elastomeric materials such as rubber, neoprene polymers, or some other elastic and resilient material. A neoprene polymer made by conventional methods having a tensile strength of 2800 p.s.i., an elongation capability of 700 percent a hardness of 60 duro and a specific gravity of approximately 1.30 has worked very well in actual operation. Apertures 18 and 20 are located in the end portions 14 and 16, respectively, of the body 12.

Referring particularly to FIG. 4, it will be seen that the enlarged end portion generally indicated 14 merges into the main cord body 12 by a gradually tapering neck portion 22, the outer end of the enlarged end portion 14 being rounded, as shown at 24. This design provides the end portion with a cross-sectional area which is at least as great if not greater than the cross-sectional area of the main body 12.

Embedded in the enlarged end portions 14 and 16 surrounding the apertures 18 and 20 are ring members 26 and 28, respectively. As can be seen in FIG. 3, the ring member 26 is embedded equidistant around the aperture 18 and is located midway midway between the top 30 and the bottom 32 of the enlarged end portion 14. Of course this invention would still be operable if the ring member would not be in the exact alignment described above. The same also applies to the relationship of ring member 28 and aperture 20 in the enlarged end portion 16. Tapered insert members 34 and 36 fit within apertures 18 and 20 respectively and provide a bearing surface which distributes the applied load.

The embedded ring members 26 and 28 are preferably constructed of black iron, although other rigid materials can be used. However, with black iron it is possible to achieve a high bond adhesion strength between the iron and the elastomeric material of the cord body 12. An adhesion strength of around 85 p.s.i. peel pull is desirable.

The process of manufacturing the elastic tension cord of this invention includes sandblasting the ring member, applying an adhesive coating to the ring member to achieve an elastomer to metal bond, placing the ring member within the mold, filling the mold with the desired elastomeric compound, applying suitable pressure and heat to mold, removing the cord from the mold and trimming off the mold flash from the cord.

Figure 1:
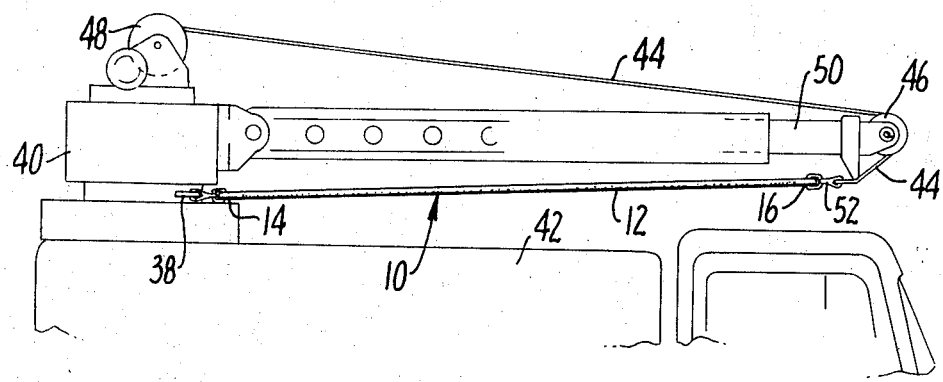
FIG. 1 is a side elevation of a derrick or boom arrangement mounted on a truck and showing the elastic tension cord connecting to a fixed bracket at one end and attached at the other end to a winch line.

FIG. 1 illustrates the elastic tension cord of the present invention in actual operation wherein one end of the cord 10 is attached to a fixed bracket 38 on a derrick or boom 40 located on top of truck 42 and the other end is attached to winch line 44 which passes over idler sheave 46 and encircles the power drive winch drum 48. With the elastic tension cord 10 in position the extendable portion 50 of the boom 40 can be selectively extended without causing serious damage to the extendable portion 50, the idler sheave 46, the winch line 44, or the power driven winch drum 48 because the tensile force caused by the extension is initially absorbed by the cord 10 which elongates as required.

To connect the cord 10 to the eye 52 of the winch line 44 and fixed bracket 38 well known connecting means such as a shackle and pin 54 and snap 56 are provided which will pass through the apertures 18 and 20 and will bear against the tapered insert members 34 and 36 when tensile force is applied.

As seen in FIG. 5, the application of tensile force in the direction indicated by arrow 58 shifts the center line 60 of the aperture 18 in the direction of the force to location 62 thereby causing compression in the area of the cord between points 64 and 66, the distance between the outer end of the insert member 34 and the inner edge of the embedded ring member 26. The rest of the cord is in tension except at the other end of the cord between the outer end of insert member 36 and the inner edge of embedded ring member 28 where the same compression exists.

I claim:

1. An elastic tension cord comprising:
   a. an elongated body of elastomeric material adapted to be subjected to tension applied at both ends thereof;
   b. an aperture near the end of said elongated body; and
   c. a ring member embedded in said elongated body and surrounding said aperture whereby tension applied to said body creates a state of compression in the force direction of the applied tension in the portion of said body between said aperture and said ring member.

2. The elastic tension cord of claim 1 wherein the ring member is constructed of metal.

3. The elastic tension cord of claim 1 wherein the ring member is embedded equidistant around the aperture.